W. S. WOOD.
Securing Handles to Burial-Caskets.

No. 156,520. Patented Nov. 3, 1874.

WITNESSES:
A. W. Almqvist
A. F. Terry

INVENTOR:
W. S. Wood
BY
ATTORNEYS.

UNITED STATES PATENT OFFICE.

WILLIAM S. WOOD, OF NEWTOWN, NEW YORK.

IMPROVEMENT IN SECURING HANDLES TO BURIAL-CASKETS.

Specification forming part of Letters Patent No. 156,520, dated November 3, 1874; application filed September 19, 1874.

CASE D.

*To all whom it may concern:*

Be it known that I, WILLIAM S. WOOD, of Newtown, Queens county, New York, have invented a new and useful Improvement in Mode of Fastening Handles to Metallic Burial-Cases, of which the following is a specification:

The invention will first be fully described, and then pointed out in the claim.

Figure 1:
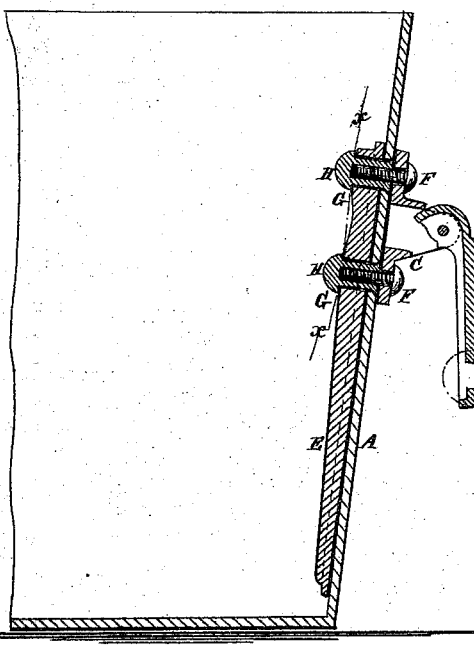
Figure 2:
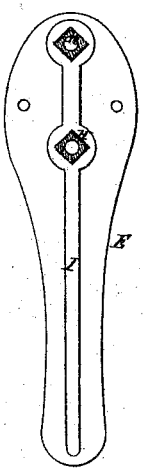

Figure 1 represents a vertical section of the side of a burial case or casket, and Fig. 2 is a side view of the stay-plate detached, as seen from the line *x x*, Fig. 1.

Similar letters of reference indicate corresponding parts.

A is the side of the burial-casket, to which the handle is attached. B is the handle, which may be of any suitable design, shape, or configuration. C is the cap-plate of the handle, which is placed upon the outer surface of the burial-case, and to which the handle is hinged, as seen at D. This ear-plate may extend from one end to the other of the handle, or it may be made in two or more parts, according to the length of the handle. It is usually of some ornamental design, and plated or finished the same as the handle, and forms in fact a part of the handle. E is a stay-plate, placed on the inside of the casket. F are screws, and G are nut-rivets, having square shanks, which pass through square holes in the stay-plate, and through the side of the case, and are riveted thereto to keep them in place before the handles are attached. These nut-rivets have heads H, and are provided with interior screw-threads, which receive the screws F, which go through the ear-plate C. The stay-plate E extends down through the case to near the bottom with a rib, I, on its outer side, and has a tendency to stiffen the side of the case, and keep it in shape when lifting upon the handles.

Having thus described my invention, I claim as new, and desire to secure by Letters Patent—

The combination of handle, ear-plate, and stay-plate, secured by screws and nut-rivets, in the manner described.

WILLIAM S. WOOD.

Witnesses:
T. B. MOSHER,
ALEX. F. ROBERTS.